United States Patent
Michael et al.

(10) Patent No.: US 6,301,396 B1
(45) Date of Patent: Oct. 9, 2001

(54) NONFEEDBACK-BASED MACHINE VISION METHODS FOR DETERMINING A CALIBRATION RELATIONSHIP BETWEEN A CAMERA AND A MOVEABLE OBJECT

(75) Inventors: David J. Michael, Framingham; Aaron S. Wallack, Natick, both of MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/223,855

(22) Filed: Dec. 31, 1998

Related U.S. Application Data

(63) Continuation of application No. 08/755,766, filed on Nov. 21, 1996, now Pat. No. 5,960,125.

(51) Int. Cl.⁷ .................................................... G06K 9/32
(52) U.S. Cl. ............................ 382/294; 382/151; 700/254
(58) Field of Search ............................ 700/254; 382/151, 382/294, 295; 343/94, 95, 129

(56) References Cited

U.S. PATENT DOCUMENTS

| | | |
|---|---|---|
| 3,816,722 | 6/1974 | Sakoe et al. . |
| 3,936,800 | 2/1976 | Ejiri et al. . |

(List continued on next page.)

FOREIGN PATENT DOCUMENTS

| | | |
|---|---|---|
| WO 95/122137 | 8/1995 | (WO) . |
| WO 95/21376 | 8/1995 | (WO) . |

(List continued on next page.)

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

(List continued on next page.)

*Primary Examiner*—Amelia M. Au
*Assistant Examiner*—Jingge Wu
(74) *Attorney, Agent, or Firm*—David J. Powsner

(57) ABSTRACT

A method is provided for determining a calibration relationship between a reference frame of motion of an object and a reference frame of a camera that generates images of the object. The method includes the steps of coupling a target to an object and placing the object at each of plural locations and orientations that are known with respect to the motion reference frame of the object. The location of the target(s) with respect to the object need not be known. An image of the object and target is generated while the object is at each of those locations/orientations. From each those images, the method determines the location/orientation of the target with respect to the reference frame of the camera. The method then calls for determining the calibration relationship between the reference frame of motion of the object and the camera reference frame as a function of the locations/orientations of the object with respect to the motion reference frame of the object and the locations/orientations of the target in the corresponding images with respect to the reference frame of the camera.

10 Claims, 6 Drawing Sheets

U.S. PATENT DOCUMENTS

| | | |
|---|---|---|
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,027,419 | 6/1991 | Davis . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,083,073 | * 1/1992 | Kato ................................. 700/254 |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,179,419 | 1/1993 | Palmquist et al. . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,238 | 3/1994 | Wang et al. . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,329,469 | 7/1994 | Watanabe . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,371,836 | * 12/1994 | Mitomi et al. ..................... 700/254 |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,471,312 | 11/1995 | Watanabe et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,553,859 | 9/1996 | Kelly et al. . |
| 5,557,410 | 9/1996 | Huber et al. . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |

FOREIGN PATENT DOCUMENTS

| | | |
|---|---|---|
| WO 97/21189 | 6/1997 | (WO) . |
| WO 97/22858 | 6/1997 | (WO) . |
| WO 97/24692 | 7/1997 | (WO) . |
| WO 97/24693 | 7/1997 | (WO) . |

OTHER PUBLICATIONS

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "Picturetel System 4000(tm) A Family of Models to Fit Your Application from Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

* cited by examiner

NONFEEDBACK-BASED MACHINE VISION METHODS FOR DETERMINING A CALIBRATION RELATIONSHIP BETWEEN A CAMERA AND A MOVEABLE OBJECT

REFERENCE TO RELATED APPLICATIONS AND RESERVATION OF COPYRIGHT

This application claims the benefit of, commonly assigned U.S. patent application Ser. No. 08/755,766, filed Nov. 21, 1996, now Pat. No. 5,960,125 the teaching off which are incorporated herein by reference.

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to methods for calibrating the reference frame of a camera to that of a moveable object (e.g., a motion stage) imaged by the camera.

Machine vision refers to the automated analysis of an image to determine characteristics of objects and other features shown in the image. It is often employed in automated manufacturing lines, where images of components are analyzed to determine placement and alignment prior to assembly. Machine vision is also used for quality assurance. For example, in the semiconductor device industry, images of chips are analyzed to insure that leads, solder paste and other components do not overrun designated boundaries.

In many machine vision applications, it is essential to correlate locations in the "real world," e.g., on a motion stage or conveyor belt, with coordinates in an image. For example, a camera image of a part being assembled on a robotic assembly line may reveal that a component is misplaced by several pixels. In order to move the motion stage so that the object can be properly repositioned, the relationship between coordinates in the image and on the motion stage must be known. That relationship is known as the calibration relationship.

The prior art suggests the use of so-called calibration plates to determine the calibration relationship between a camera and an object. A typical calibration plate consists of a complex "target," such as an array of dots, a checkerboard, a bulls-eye of concentric circles, or a set of parallel stripes, that is placed on the object. Traditionally, it has been important to construct and reproduce these plates carefully because any error in the target will be wrongly "corrected for" when the camera is calibrated. For example, if the circles in a bulls eye-type target are slightly eccentric, the resulting calibration may produce an incorrect aspect ratio (i.e., the ratio of width to height).

It is sometimes quite difficult to construct an accurate calibration target. This is particularly true when the camera magnification is very large and the corresponding calibration target is very small. Here, even a small deviation in the target will result in an incorrect calibration relationship. This problem is exacerbated in machine vision systems that utilize multiple cameras to image a single target, e.g., systems of the type used in semiconductor chip manufacture, in which two or more high resolution cameras are used to inspect, simultaneously, multiple disparate regions on the chip surface. In addition to the difficulties associated with calibrating the reference frame of a single camera to the real world reference frame of the chip surface (or motion stage), are those associated with calibrating the reference frames of the cameras to one another.

An object of this invention is to provide improved machine vision systems and, particularly, improved machine visions methods for calibrating the reference frame of a camera to that of a moveable object (e.g., a motion stage) imaged by the camera.

Another object of the invention is to provide such methods as can calibrate the reference frames of multiple cameras to each other, as well as to that of a moveable object imaged by the cameras.

Yet another object of the invention is to provide such methods as minimize reliance on precisely machined calibration targets and plates.

Yet still another object of the invention is to provide such methods as can be implemented on conventional digital data processors or other conventional machine vision analysis equipment.

Still yet another object of the invention is to calibrate the reference frames of multiple cameras with respect to the motion stage's center of rotation.

Yet still another object of the invention is to provide such methods that can rapidly determine calibration relationships without undue consumption of resources.

SUMMARY OF THE INVENTION

The aforementioned objects are among those met by the invention, which provides in one aspect a method of determining a calibration relationship between a reference frame of motion of an object and a reference frame of a camera (or other image acquisition device) that generates images of the object. The method includes the steps of coupling a target to the object and placing the object at each of plural locations (and orientations) that are known with respect to the motion reference frame of the object. The location and orientation of the target with respect to the object need not be known.

An image of the object and target is generated while the object is at each of those locations/orientations. From each those images, the method determines the location and, optionally, the orientation, of the target with respect to the reference frame of the camera. The method then calls for determining the calibration relationship between the reference frame of motion of the object and the camera reference frame as a function of the known locations/orientations of the object (with respect to its motion reference frame) and the locations (or locations and orientations) of the target in the corresponding images (with respect to the reference frame of the camera).

In another aspect, the invention provides a method for determining a calibration relationship between a reference frame of motion of an object and a reference frame of each of plural cameras that generate images of the object. The method includes the steps of coupling plural targets to the object and placing the object at plural locations/orientations that are known with respect to the motion reference frame of the object. At least one target remains in the field of view of each respective camera as the object's placement is changed. Any given target need not remain in the field of view of its respective camera for all of the placement changes but, merely, for plural changes. As above, the location and orientation of the targets with respect to the object need not be known.

An image of the object and target is generated by each camera while the object is at each of the locations/ orientations. From each those images, the method determines the location (or location and orientation) of the target with respect to the reference frame of the respective camera. As above, the calibration relationship between the reference frame of motion of the object and the camera's reference frames is determined as a function of the known locations/orientations of the object (with respect to its motion reference frame) and the location (or location and orientation) of the target in the corresponding images (with respect to the reference frame of the camera).

A related aspect of the invention provides a method as described above, in which the plural targets are coupled to the object such that the relative locations and/or orientations of the targets with respect to one another are known. With this information, the method can determine the calibration relationship between the reference frames of the cameras themselves as a function of known locations/orientations of the object, the location (or location and orientation) of the targets in the corresponding images of the object, and the known relative locations/orientations of the targets with respect to one another.

Further aspects of the invention provide methods as described above in which the method determines the calibration relationships between the motion reference frame of the object and the motion reference frame of the camera(s) by solution of a linear equation and particularly, for example, by a linearized least squares fit that minimizes an error between known locations/orientations of the object and estimates of those locations/orientations based on candidate calibration relationships. In a related aspect of the invention, the candidate calibration relationship can be determined by gradient descent.

In still further aspects, the invention provides a method of determining a calibration relationship between a reference frame of a motion stage and a reference frame of each of plural cameras that generate images of that stage. The method includes the steps of placing a calibration plate including plural targets on the motion stage that is at a known location/orientation $(m_x, m_y, \theta)_j$. Each target on the plate has a known location $(w_{xi}, w_{yi})$ relative to the other targets and is in the field of view of a respective camera. The locations of the targets relative to the motion stage reference frame need not be known.

The method calls for generating an image of the object with each of the respective cameras and determining a location $(i_x, i_y)_{i,j}$ of the target in each of those images. The motion stage is then placed at one or more other known locations/orientations $(m_x, m_y, \theta)_j$, where (j)>1, such that each target is in the field of view of its respective camera for at least some (e.g., three or more) of those locations/orientations. Again, images of the object are generated by the respective cameras at the locations $(i_x, i_y)_{i,j}$, where (j)>1, of the target in each of those additional images is determined.

The method determines the calibration relationship between the reference frame of the motion stage and the reference frames of the cameras as a function of (i) the known locations/orientations of the motion stage $(m_x, m_y, \theta)_j$, where (j)≧1, (ii) the locations $(i_x, i_y)_{i,j}$, where (j)≧1, of the targets in the corresponding images, and (iii) the relative locations $(w_{xi}, w_{yi})$ of the targets on the calibration plate.

In a related aspect of the invention, a method as described above calls for determining the calibration relationship by minimizing an error $E_{i,j}$ between known locations/orientations of the motion stage and estimates thereof in accord with the mathematical relationship $$E_{i,j} = \left\| \begin{bmatrix} \cos\theta_j & -\sin\theta_j \\ \sin\theta_j & \cos\theta_j \end{bmatrix} \begin{bmatrix} m_{x_j} \\ m_{y_j} \end{bmatrix} - \begin{bmatrix} O_{xi} \\ O_{yi} \end{bmatrix} - \begin{bmatrix} \alpha U & \beta V \\ \alpha V & \beta U \end{bmatrix} \begin{bmatrix} G(i_{x_{ij}}, i_{y_{ij}}) \\ H(i_{x_{ij}}, i_{y_{ij}}) \end{bmatrix} \right\|$$

where $(m_x, m_y, \theta)_j$ represents the known motion stage locations/orientations, $(i_x, i_y)_{i,j}$ represents locations of the targets in the images, $(w_{xi}, w_{yi})$ represents the known locations of each target on the calibration plate, $\tau_i$ represents an orientation of target (i) in an image thereof, $G_i(u,v)$, $H_i(u,v)$ represent lens distortion correction functions mapping coordinates (u,v) in an image to an orthonormal image coordinate system (ix,iy), $P_{xi}, P_{yi}$ represent a position of target (i) in motion stage coordinates when the motion stage is at (x=0,y=0,θ=0), $\alpha_i, \beta_i$ represent pixel width and height for camera field of view i, U and V represent the cosine and sine, respectively, of each camera's coordinate frame with respect to the motion stage's coordinate frame. In instances where a camera suffers skew, U and V may take on multiple values which are substituted into the corresponding portion of the equation.

In still another aspect of the invention, the method calls for determining the calibration relationship by minimizing an error $E_{i,j}$ between known locations/orientations of the motion stage and estimates thereof in accord with the following mathematical relationship $$E_{i,j} = \left\| \begin{bmatrix} \cos\theta_j & -\sin\theta_j \\ \sin\theta_j & \cos\theta_j \end{bmatrix} \left( \begin{bmatrix} \cos\theta_c & -\sin\theta_c \\ \sin\theta_c & \cos\theta_c \end{bmatrix} \begin{bmatrix} w_x \\ w_y \end{bmatrix} + \begin{bmatrix} x_c \\ y_c \end{bmatrix} \right) \right.$$
$$\left. \begin{bmatrix} m_{x_j} \\ m_{y_j} \end{bmatrix} - \begin{bmatrix} O_{xi} \\ O_{yi} \end{bmatrix} - \begin{bmatrix} \alpha U & \beta V \\ \alpha V & \beta U \end{bmatrix} \begin{bmatrix} i_{x_{ij}} \\ i_{y_{ij}} \end{bmatrix} \right\|$$

where $(m_x, m_y, \theta)_j$ represents the known motion stage locations/orientations, $(i_x, i_y)_{i,j}$ represents locations of the targets in the images, $(w_{xi}, w_{yi})$ represents the known locations of each target on the calibration plate, $(x_c, y_c, \theta_c)$ represent unknown locations/orientations of the calibration plate with respect to the motion stage, $\tau_i$ represents an orientation of target (i) in an image thereof, $\alpha_i, \beta_i$ represent pixel width and height for camera field of view i, U and V represent the cosine and sine, respectively, of each camera's coordinate frame with respect to the motion stage's coordinate frame. In instances where a camera suffers skew, U and V may take on multiple values which are substituted into the corresponding portion of the equation.

A related aspect of the invention calls for iteratively (i) using gradient descent to vary $\theta_c$, and (ii) determining the calibration relationship by solving for the error $E_{i,j}$ at each of those values of $\theta_c$.

The invention has wide application in industry and research applications. It facilitates the calibration of machine vision image acquisition equipment (e.g., cameras) in order to improve the speed and accuracy of analysis of objects under inspection. Thus, for example, a machine vision system calibrated in accord with the invention can be used to automatically control movement of an assembly line motion stage without reliance on expensive, and possibly flawed, calibration plates.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
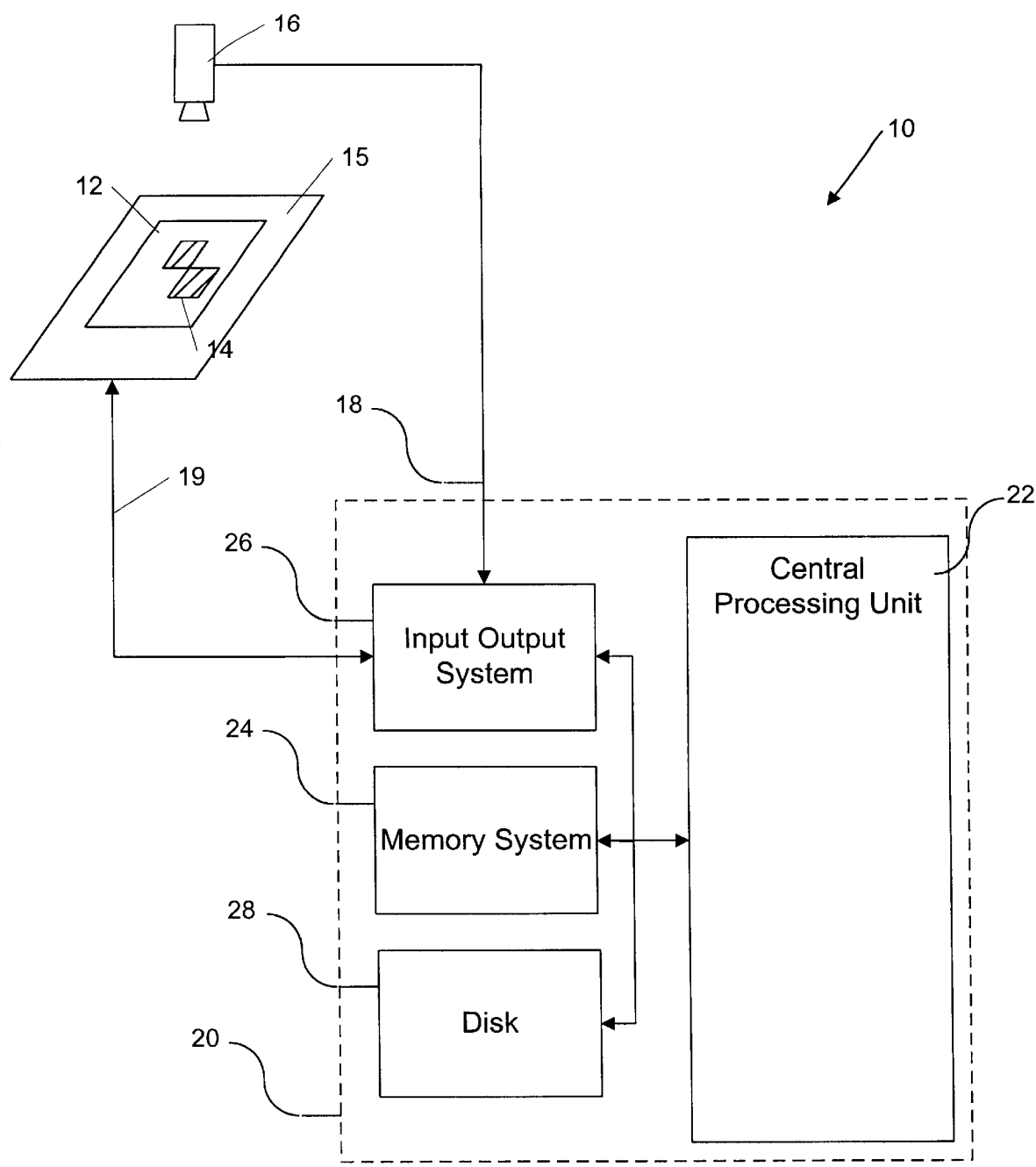
FIG. 1 depicts a machine vision system for practice of the invention.

FIG. 1 depicts a machine vision system 10 according to the invention for determining calibration relationship between the reference frame of motion of an object 12 and the reference frames of image acquisition device 16. The system 10 includes an image capture device, e.g., camera 16, that generates an image of a scene including object 12. Digital image data (or pixels) generated by the capturing device 16 represent, in the conventional manner, the image intensity (e.g., contrast, color, brightness) of each point in the field of view of the capturing device. In the illustration, the object 12 is disposed on a motion stage 15 capable of translating and rotating the object.

That digital image data is transmitted from capturing device 16 via a communications path 18 to an image analysis system 20. This can be a conventional digital data processor, or a vision processing system of the type commercially available from the assignee hereof, Cognex Corporation, as programmed in accord with the teachings hereof to determine the calibration relationship between the motion reference frame of the object 12 and that of the image acquisition device 16. The image analysis system 20 may have one or more central processing units 22, main memory 24, input-output system 26, and disk drive (or other mass storage device) 28, all of the conventional type. The image acquisition device may be video camera, charge coupled display (CCD) device, or any other device suitable for imaging device at least a target 14 disposed on object 12.

The image analysis system 20 can control movement of the object via communications path 19. More particularly, the system 20 transmits signals for controlling translation and rotation of the motion stage 15 and, in turn, controls the position of object 12 on stage 15.

The system 20 and, more particularly, central processing unit 22, is configured by programming instructions according to teachings hereof for operation as further describe and illustrated herein. Those skilled in the art will appreciate that, in addition to implementation on a programmable digital data processor, the methods taught herein can be implemented in special purpose hardware.

Figure 2:
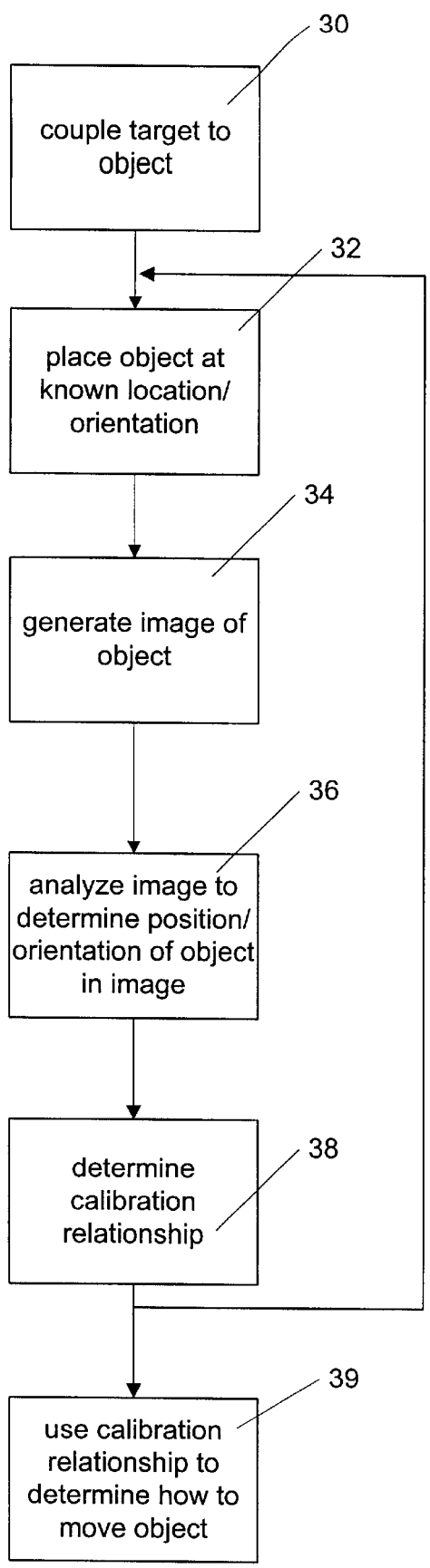
FIG. 2 depicts a method according to the invention for determining a calibration relationship between the reference frame of motion of an object and that of image acquisition device.

FIG. 2 depicts a method for calibrating determining a calibration relationship between the reference frame of motion of an object 12—and, more particularly, in the case of an object 12 that is disposed on a motion stage 15, the reference frame of motion of the motion stage 15 and that of image acquisition device 16. The method includes a step 30 of coupling a target 14 to the object. A feature of the invention is that the position of the target relative to the object 12 and its reference frame of motion need not be known.

Figure 3A:
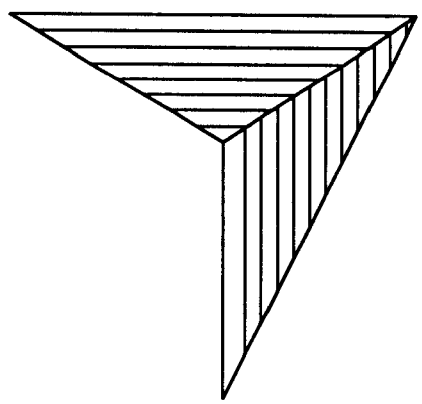
FIGS. 3A–3C depict magnitude invariant targets of the type used in a preferred practice of the invention.
Figure 3B:
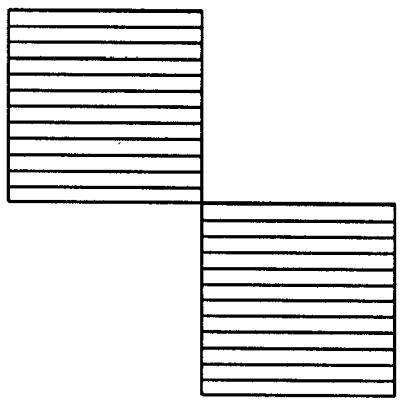
Figure 3C:
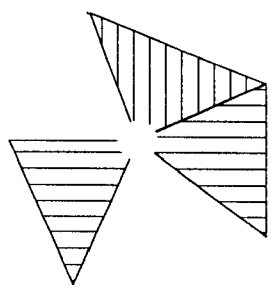

The target can be any conventional calibration target (e.g., an array of dots, a checkerboard, a bulls-eye of concentric circles, or a set of parallel stripes) though, more preferably, it is a magnification invariant target of the type shown in FIGS. 3A–3C and disclosed in co-pending, commonly assigned U.S. patent application Ser. No. 08/726,521, filed Oct. 7, 1996. As discussed in further detail in that co-pending, commonly assigned application (the teachings of which are incorporated herein by reference), a preferred calibration target has two or more regions, each having a different "imageable characteristic" (e.g., a different color, contrast, or brightness) from its neighboring region(s). Each region has at least two edges—referred to as "adjoining edges"—that are linear and that are directed toward and, optionally meet at, a reference point (e.g., the center of the target or some other location of interest). The method includes generating an image of the target, identifying in the image features corresponding to the adjoining edges, and determining the orientation and position of the target from those edges.

As used herein, the term "location/orientation" means location and/or orientation. Likewise, the term "locations/orientations" means locations and/or orientations. Thus, for example, the phrase "an image of the object and target is generated while the object is at each of those locations/orientations" means that an image of the object and target is generated while the object is at each of plural different locations and/or orientations.

Calibration targets of this type, e.g., as shown in FIG. 3B, are advantageously processed by a method according to the invention insofar as they further minimize bias otherwise introduced by a conventional edge detection techniques. In this regard, it will be appreciated that such bias is reduced by the fact that "opposing" adjoining edges (i.e., edges that oppose one another across the reference point) define straight linear segments that change polarity across the reference point. That is, those segments are defined by regions that transition—preferably, equally in magnitude—from light-to-dark one side of the reference point, and from dark-to-light on the other side. This is true for all "symmetric" calibration targets according to the invention, i.e., targets in which opposing edges define straight linear segments that are opposite polarity on either side of the reference point.

The target can be molded onto, etched into, printed on, or otherwise coupled to the object. In instances where the object 12 resides on a motion stage 15, the target is placed on a calibration frame, e.g., a rigid frame (not shown) which, in turn, is placed on the motion stage. Although the calibration plate can be bolted, fit or otherwise coupled to the motion stage, preferably, it is placed on the stage 15 and held in place by a vacuum (through, it can simply be held on by friction). As noted above, the position of the target relative to the object 12 and its reference frame of motion need not be known.

In the illustrated embodiment, motion stage 15 has an actuator with a rotator mounted on a translating base such that the stage's center of rotation translates with the base. The term center of rotation refers to the (x,y) location of the physical point which remains stationary when the motion stage rotates. A preferred motion stage 15 has three degrees of freedom.

With reference to FIG. 2, in step 32 the method calls for placing the object at a first known location and with a first rotational orientation. That location and orientation can be determined absolutely or relative to the reference frame, e.g., of the assembly plant in which the object is locate. In instances where the object 12 is the motion stage 15 itself, that location is preferably determined from the reference frame or positional settings on the stage itself. For example, before or after the target 14 is placed on the object (in step 30), step 32 can involve moving the motion stage (and, consequently, the object 12) to any known positional and rotational setting permitted by the motion stage 15, e.g., position (0,0) and rotation 0°. Regardless of whether an absolute reference frame, a relative reference frame or a reference frame of the motion stage is used, that reference frame is hereinafter referred to as the reference frame of motion of the object 12.

In step 34, the image acquisition device 16 is employed to generate an image of the object 12 and target 14. Digital image data (or pixels) generated by the capturing device 16 represent, in the conventional manner, the image intensity (e.g., contrast, color, brightness) of each point in the field of view of the capturing device.

In step 36, the method calls for analyzing the image to determine the position and orientation of the object—and, particularly, the target 14—in the reference frame of the image acquisition device 16. Coordinates of that reference frame are typically expressed in pixels and degrees (or radians). Thus, although a target may reside at location/orientation (12", 20", 30°) in the reference frame of motion of the object (e.g., the motion stage reference frame), it may reside at (−4 pixels, 156 pixels, 274°) in the reference frame of the camera (and, therefore, of the image).

The position and orientation of the target 14 in the image is determined in a manner appropriate to the type of target. For targets such as an array of dots, a checkerboard, a bulls-eye of concentric circles, or a set of parallel stripes, conventional technique are employed for determining target position and orientation. For preferred targets of the type shown in FIGS. 3A–3C and disclosed in co-pending, commonly assigned U.S. patent application Ser. No. 08/726,521, a technique of the type shown in FIG. 4 of that application and disclosed in the accompanying text (all of which are incorporated by reference herein) is used to determine target position and orientation.

As shown in FIG. 2 (of the present application), steps 32 through 36 are executed at least thrice (i.e., repeated at least twice)—and, preferably, more times—in order to provide sufficient information from which to determine the desired calibration relationship. In this regard, it will be appreciated that by imaging a singular target (e.g., of the type shown in FIGS. 3A–3C) at multiple different locations, the illustrated method in effect creates a "virtual" calibration plate, as illustrated in FIGS. 4A–4G.

As noted above, in an embodiment with multiple image acquisition devices, each target preferably remains in the field of view of each camera as the object position changes. Although any given target need not remain in its respective camera's field of view for all position changes, it preferably does so for at least three changes. Conversely, where multiple targets are in a camera's field of view, those targets are preferably distinct from one another, so that the imaging system 20 can distinguish changes in position of one target from those of the others.

Figure 4A:
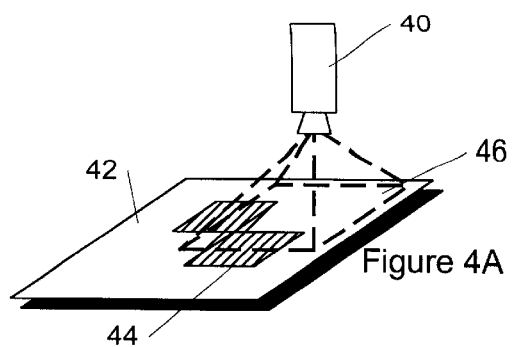
FIGS. 4A–4H illustrate the construction of a "virtual" calibration plate through use of a methodology according to the invention.

Referring to FIG. 4A, there is shown a camera 40 that generates an image of moveable object, e.g., motion stage 42, which has a target 44 thereon. The camera has a field of view 46, denoted by dashed lines, which defines the boundaries of the images generated by it. In accord with the method described above, the motion stage 42 is placed at a first known position (e.g., a position that can be determined by settings on the motion stage itself), e.g., such that the center of the target 44 is in the lower left hand corner of the field of view. An image of the motion stage 42 and target 44 is then generated by the camera 40.

Figure 4B:
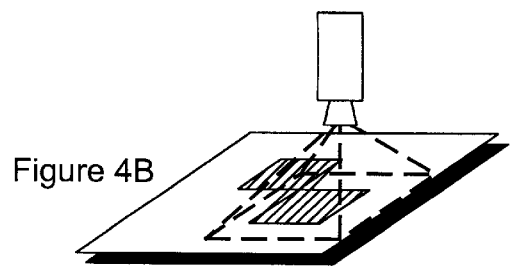
Figure 4C:
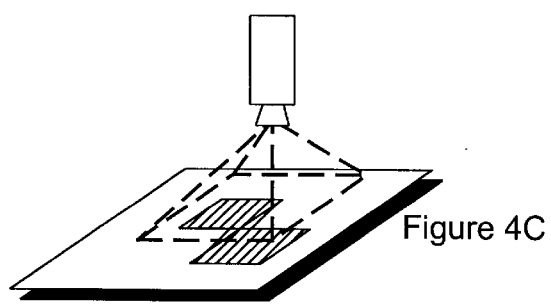
Figure 4D:
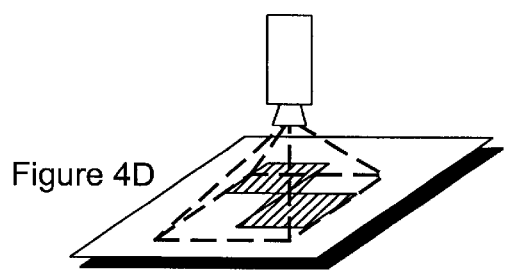
Figure 4E:
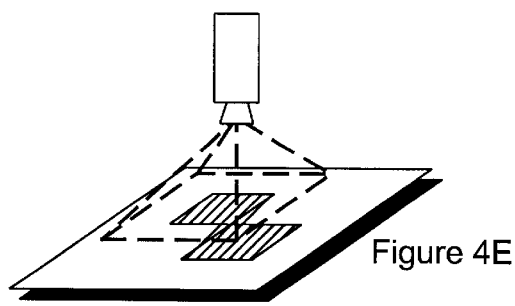
Figure 4F:
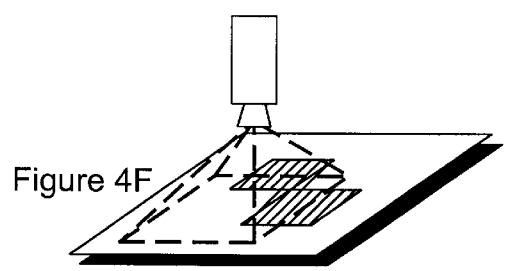

In FIG. 4B, the motion stage is moved to a second known position, e.g., such that the center of the target 44, e.g., is in the upper left hand corner of the field of view. Again, an image of the motion stage 42 and target 44 is generated by the camera 40. In FIGS. 4C–4F, the motion stage is progressively moved to subsequent known positions, as illustrated, and respective images of the motion stage 42 and target 44 are generated.

Figure 4G:
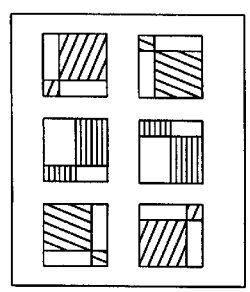
Figure 4H:
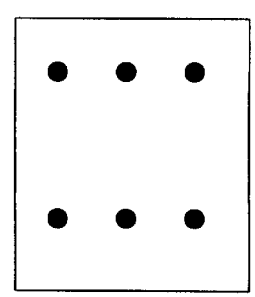

By moving and imaging the motion stage 42 and target 44 at the six positions shown in FIGS. 4A–4F, the method effectively creates a calibration plate with six calibration points. This is shown in FIG. 4G, where there is shown a montage of images generated by the camera as the stage and target are moved to those positions. This is also shown in FIG. 4H, where the centers of the targets shown in the montage of FIG. 4G are shown as points. As those skilled in the art will thus appreciate, by imaging a target at multiple different locations, the illustrated method in effect creates a virtual calibration plate of the type shown in FIGS. 4G and 4H.

A virtual calibration has many advantages over conventional calibration methods. First, virtual calibration targets provide an effective method for calibrating the camera fields of view with respect to the motion stage's coordinate frame, which is usually the main purpose of the machine vision system. In most applications involving motion stages, the machine vision system measures a target with respect to the motion stage's coordinate frame (aligned to the motion stage's axes and centered at the stage's center of rotation), so that the system can then move the target to a pre-specified position. Second, the virtual calibration target approach can provide higher accuracy than conventional calibration target approaches because calibration target features can cover a larger area in the field of view and can therefore be more accurately registered. Third, the virtual calibration technique can be used with one or multiple cameras and one or more fields of view such that at least one target feature is seen within each camera's field of view.

Figure 5:
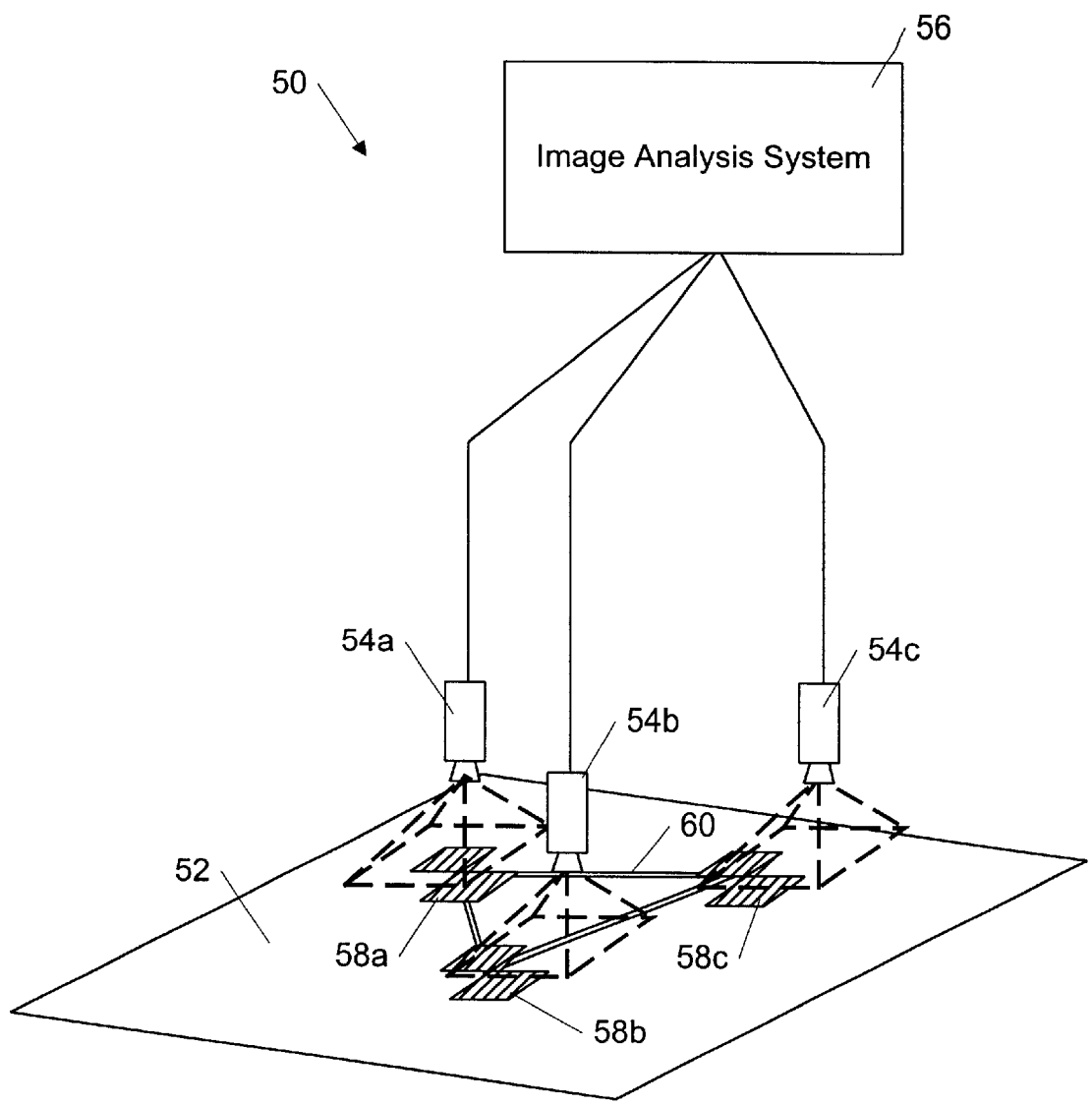
FIG. 5 depicts a machine vision system according to the invention for determining calibration relationship between the reference frame of motion of a moveable object and that of plural cameras.

FIG. 5 depicts a machine vision system 50 according to the invention for determining calibration relationship between the reference frame of motion of a moveable object 52, e.g., an object on a motion stage (not shown), and the reference frames of cameras (or other image acquisition devices) 54a, 54b, 54c. The cameras 54a, 54b, 54c generate images of respective portions of the object in the conventional manner. Those images are transmitted from the cameras to an image analysis system 56 which is constructed and operated like the machine vision system 20, described above, except insofar as the system 56 is programmed in accord with the teachings hereof to determine the calibration relationship between the motion reference frame of the object 52 and that of the cameras 54a–54c. In addition, the system 56 determines the calibration relationship between the cameras themselves.

A methodology for operation of the system 50 is as shown in FIG. 2 and described above. With respect to step 30, rather then coupling a single target to the object, the method calls for placement of multiple targets 58a, 58b, 58c on the object. As above, the position of the targets 58a, 58b, 58c on the object 52 need not be known. Instead, only the position/orientation of the object itself (e.g., the motion stage settings) need be known.

Although FIG. 5 shows use of a single target 58a, 58b, 58c for each camera 54a, 54b, 54c, those skilled in the art will appreciate more than one target can be used for a single camera and, conversely, that a single target can serve more then one camera.

Though the position of the objects need not be known, in a preferred embodiment of the invention the relative position of the targets 58a, 58b, 58c with respect to one another is known. Thus, for example, as shown in the illustration, the targets 58a, 58b, 58c are mounted to a frame 60 that holds the targets in fixed positions and orientations with respect to one another. Although the illustrated frame 60 is triangular, those skilled in the art will appreciate that any object capable of holding the targets 58a, 58b, 58c in fixed positions and orientations with respect to one another will suffice. Moreover, the targets can be individually placed to the object 52 with known relative positioning and orientation, or their relative positions and orientations can be measured after placement.

Figure 6:
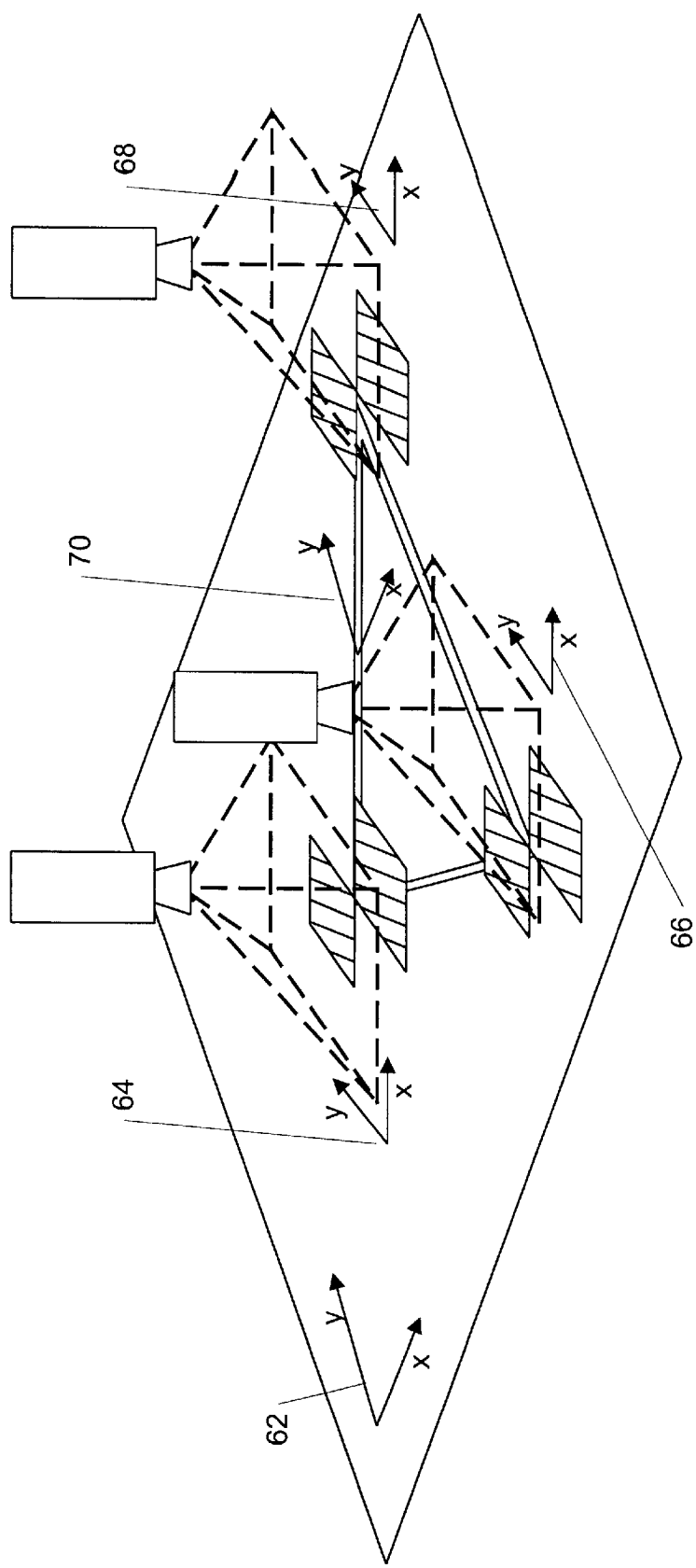
FIG. 6 depicts the relationship of reference frames of multiple cameras, a motion stage and a target frame in the machine vision system of FIG. 5.

The reference frame of the cameras 54a. 54b, 54c need not be aligned with each other, nor with that of frame 60, nor with that of the object 52. This is illustrated in FIG. 6, where the alignment of the reference frame of object 52 is depicted by axes 62, while the alignment of the reference frames of cameras 54a. 54b, 54c are depicted by axes 64, 66, 68, and that of frame 60 is depicted by axes 70.

With respect to step 32, the methodology for operation of system 50 calls for positioning and moving each target so that it remains in the field of view of a respective camera 54a, 54b, 54c. Thus, in the same manner as described above, the successive placements of the targets describe a virtual calibration plate with respect to the field of view of each camera.

With respect to single camera (FIG. 1) and multi-camera (FIG. 5) embodiments, referring to step 38 of FIG. 3, after moving the target around the field of view (via the motion stage), the calibration relationship—and, more particularly, the camera's calibration parameters—are determined from the motion stage positions and the associated positions of the target in the corresponding images. With respect to multi-camera embodiments (FIG. 5), the inter-camera calibration relationship is additionally determined based on the relative positions of the targets on the calibration frame. The calibration parameters include, for each camera, the correlation between image position and motion stage position (the "position" parameter), the correlation between image orientation and motion stage orientation (the "orientation" parameter), the aspect ratio of the image (the "pixel scales" parameter") and lens distortion.

In step 39, the calibration parameters determined in step 38 are used to control the object 12. Referring to FIG. 1, for example, where the illustrated embodiment is used to position the motion stage 15 such that a target 14 appears at the center of an image generated by acquisition device 16, the image analysis system 20 utilizes the calibration parameters (along with information on the current location of the target) to generate control signals for moving the stage 15 by an amount necessary to reposition the target at the center.

Referring back to FIG. 38, the calibration parameters can be estimated by defining the problem in terms of an error minimization framework. This involves modelling a system in terms of known and unknown parameters and defining an error (discrepancy) for each datum in terms of these parameters. In this case, datum consist of a motion stage position, an associated localized image target location, and a known target feature position on the calibration frame.

In an error minimization framework, the optimal parameter estimates are those which minimize the total error. For each pair of measured stage coordinate and image feature location (i.e., target location), the error component is defined to be the discrepancy between the measured image feature location (in motion stage coordinates) and the actual feature location (in motion stage coordinates). Of course, if a target is not present in any particular image, then zero error is associated with that stage coordinate/image feature pair and, correspondingly. The total error is defined as the sum of these individual error components.

The square of the discrepancy is used, rather than the discrepancy itself, and estimate the calibration parameters by minimizing the sum squared error. This approach is commonly known at least squares fitting, and it is widely used because if each error component comes from a normal (Gaussian) distribution, then the maximum likelihood estimator of the calibration parameters is the one which minimizes the sum squared error. Absent information to the contrary, least squares fitting is used because the discrepancies between predicted and measured target locations may correspond to a normal distribution.

That notwithstanding, the parameter estimates with minimum error must be solved with numerical or calculation efficiency. Techniques for this include linearized least squares and gradient descent methods. In a preferred embodiment, a specialized technique is utilized for numerically solving for camera position and orientation—when the camera scale parameters are known and lens distortion is inconsequential. This technique is described below.

To begin, we note that the following variables are defined for purposes of calculation:

| Variable name | Type | Brief Description |
| --- | --- | --- |
| $(m_x, n_y, \Theta)_j$ | Input | commanded motion stage position for trial j (colloquially, "where is the motion stage located with respect to its motion stage coordinate system?") |
| $(i_x, i_y)_{ij}$ | Input | localized feature position of target i for trial j (colloquially, "where is the target located in the image with respect to the image coordinate system?") |
| $w_{xi}, w_{yi}$ | Input | positions of calibration target i on calibration frame (colloquially, "with respect to the motion stage coordinate system, where is target i relative to the other targets?") |

-continued

| Variable name | Type | Brief Description |
|---|---|---|
| $O_{xi}, O_{yi}$ | Output | physical position corresponding to upper lefthand corner of the field of view (camera i) |
| $\tau_i$ | Output | orientation of field of view i (colloquially, "what is the correlation between the orientation of the camera field of view and the motion stage orientation?") |
| $w_i, h_i$ | Output | pixel width and height for camera field of view i (colloquially, "how does a pixel's "distance" in the image correlate with distance of the motion stage?") |
| $G_i(u,v)$, $H_i(u,v)$ | Output | lens distortion correction functions mapping image coordinates (u,v) to regular orthonormal image coordinate system (ix,iy) |
| $P_{xi}, P_{yi}$ | Output | position of calibration feature i in motion stage coordinates when motion stage is at (x=0,y=0,Θ=0) (colloquially, "if the motion stage is at (x=0,y=0,Θ=0), where is the mark on the stage?") |
| $\alpha_i, \beta_i$ | Output | pixel width and height for camera field of view i (colloquially, "how does a pixel's "distance" in the image correlate with distance of the motion stage?") |
| $E_{ij}$ | Output | error (discrepancy) associated with camera i and trial j |

In the illustrated embodiment, field of view positions are computed with respect to an absolute coordinate system. Those positions can be computed with resect to the motion stage's reference frame by subtraction out the motion stage position. As those skilled in the art will appreciate it is desirable to know the positions of the camera fields of view with respect to the motion stage's center of rotation because this allows prediction of how the image features (e.g., targets) will move when the motion stages moves in X, Y or Θ.

Those skilled in the art will appreciate that the invention does not require determination of all of the above-cited "output" parameters. That is, a calibration relationship between a camera and the moveable object (e.g., motion stage) need not encompass all of the parameters discussed above but may be limited, for example, to one or more of them, e.g., a calibration relationship may be limited to scale along each axis and the relative angle of the reference frames.

Let $(m_x, m_y, \Theta)_j$ refer to the commanded (or sensed) motion stage position and let $(i_x, i_y)_{ij}$ refer to the measured feature location in the image. Let $w_{xi}, w_{yi}$ refer to the positions of the calibration feature targets in camera field of view i measured with respect to some reference point on the calibration frame and measured in the same units as the motion stage positions are commanded. These values are the known data.

Let $O_{xi}, O_{yi}$ be defined as the positions of the upper lefthand corner of the field of view associated with camera i. Let $\tau_i$ refer to the orientation of field of view i. Let $w_i, h_i$ refer to a pixel's width and height in field of view i. Let $G_i(u,v)$, $H_i(u,v)$ refer to lens distortion correction functions which transform image coordinates (u,v) into locally linear orthogonal coordinate system (x,y) where x=G(u,v) and y=H(u,v). Let $P_{xi}, P_{yi}$ be defined as the position of the calibration feature i in motion stage coordinates when the motion stage is in its home position x=y=Θ=0. These values are the unknown data (although the pixel aspect ratio $\alpha_i/\beta_i$ or $w_i/h_i$ is usually known, because it is a function of the CCD array, the frame grabber pixel clock and the CCD pixel clock).

The discrepancy between predicted and measured image coordinates can be characterized in terms of physical locations. First the physical location corresponding to the measured image feature location is computed. To this end, lens distortion is accounted for by applying G( ) and H( ) to the measured image coordinates $(i_x, i_y)_{i,j}$. Then, the scale, position, and orientation of the field of view with respect to the motion stage are accounted for by multiplying the (x,y) location by a rotation matrix and adding the position of the upper lefthand corner of the field of view in motion stage coordinates.

Next, the physical location corresponding to the predicted feature location is computed. Begin with the target's position in motion stage coordinates $(P_{xi}, P_{yi})$. Then, apply a rotation transformation according to the stage's orientation, and add a translation offset according to the stage's translation. $E_{i,j}$ is defined to be the difference (distance) between these two positions.

The discrepancy in motion stage coordinates is characterized using the following formula:

$$E_{i,j} = \left\| \begin{bmatrix} \cos\theta_j & -\sin\theta_j \\ \sin\theta_j & \cos\theta_j \end{bmatrix} \begin{bmatrix} P_{xi} \\ P_{yi} \end{bmatrix} + \right.$$

$$\left. \begin{bmatrix} m_{xj} \\ m_{yj} \end{bmatrix} - \begin{bmatrix} O_{xi} \\ O_{yi} \end{bmatrix} - \begin{bmatrix} w_i\cos\theta & -h_i\sin\theta \\ w_i\sin\theta & h_i\cos\theta \end{bmatrix} \begin{bmatrix} G(i_{xij}, i_{yij}) \\ H(i_{xij}, i_{yij}) \end{bmatrix} \right\|$$

Making a substitution in the penultimate matrix, this can be rewritten as follows:

$$E_{i,j} =$$

$$\left\| \begin{bmatrix} \cos\theta_j & -\sin\theta_j \\ \sin\theta_j & \cos\theta_j \end{bmatrix} \begin{bmatrix} P_{xi} \\ P_{yi} \end{bmatrix} + \begin{bmatrix} m_{xj} \\ m_{yj} \end{bmatrix} - \begin{bmatrix} O_{xi} \\ O_{yi} \end{bmatrix} - \begin{bmatrix} \alpha U & \beta V \\ \alpha V & \beta U \end{bmatrix} \begin{bmatrix} G(i_{xij}, i_{yij}) \\ H(i_{xij}, i_{yij}) \end{bmatrix} \right\|$$

To determine the foregoing, αU, αV, βU, βV are determined in accord with the following equations and, from that, Θ, pixels_per_unit_x and pixels_per_unit_y:

$$\frac{1}{w_i} = \text{pixels\_per\_unit\_}x = \frac{1}{\sqrt{(\alpha U)^2 + (\alpha V)^2}}$$

$$\frac{1}{h_i} = \text{pixels\_per\_unit\_}y = \frac{1}{\sqrt{(\beta U)^2 + (\beta V)^2}}$$

$U=\frac{1}{2}((\alpha U)\times\text{pixels\_per\_unit\_}x\pm(\beta U)\times\text{pixels\_per\_unit\_}y)$ $V=\frac{1}{2}((\alpha V)\times\text{pixels\_per\_unit\_}x\mp(\beta V)\times\text{pixels\_per\_unit\_}y)$ Θ=arctan(V/U)

or

Θ=atan2(V,U)

If the camera coordinate system and the motion stage coordinate system are both right-handed or left-handed coordinate systems (as determined below), the symbol "±" is interpreted as "+" in calculating U, while the symbol "∓" is interpreted as "−" in calculating V. Otherwise, the symbol "±" is interpreted as "−" in calculating U, while the symbol "±" is interpreted as "+" in calculating V.

In view of the foregoing, it will be appreciated that the following relationship holds:

$$\begin{bmatrix} \alpha U & \beta V \\ \alpha V & \beta U \end{bmatrix} = \begin{bmatrix} \cos\theta & -\sin\theta \\ \sin\theta & \cos\theta \end{bmatrix} \begin{bmatrix} \frac{1}{pixels\_per\_unit\_x} & 0 \\ 0 & pixels\_per\_unit\_y \end{bmatrix}$$

In accord with a preferred practice, the illustrated method calls for determining if the camera coordinate system and the motion stage coordinate system are either (1) both right-handed coordinate systems or both left-handed coordinate systems, or (2) or one of each. This is done by examining the determinate of the matrix $$\begin{bmatrix} \alpha \frac{U}{\alpha} & \beta \frac{V}{\beta} \\ \alpha \frac{V}{\alpha} & \beta \frac{U}{\beta} \end{bmatrix}$$

If the determinate is positive, then the camera coordinate system and the motion stage coordinate system are assumed both to be right-handed coordinate systems or both to be left-handed coordinate systems. Otherwise, one is assumed to be right-handed and the other to be left-handed.

The optimal parameter estimates are defined in terms of minimizing the sum squared error $\Sigma(E_{i,j})^2$. Recall that we assumed that the camera calibration parameters corresponding to the minimum sum squared error are the optimal parameter estimates.

Generically, this sum squared error problem can be solved heuristically using iterative gradient descent techniques. A gradient descent approach is implemented by computing the sum square error at hypothesized parameter configurations, and also computing the partial derivatives of the error function (the change in error with respect to the change in configuration coordinates). Then, the valid configuration is determined by changing the hypothesized configuration using the partial derivatives.

As those skilled in the art will appreciate, the gradient descent methods have problems with local minima (i.e., finding and returning a set of camera calibration parameters which have locally have minimum error, but where there is an even better choice of camera calibration parameters which we failed to find/return). There are many approaches for overcoming problems of local minima; these include simulated annealing methods (wherein a random motion is introduced into the gradient descent, and gradually shrink the size of this random motion) and starting the gradient descent search at various hypothetical camera calibration parameters.

Alternatively, there are many algebraic methods for solving nonlinear equations; these include homotopy methods, LaGrange multipliers, algebraic elimination theory. Most of these methods are slower than real-time, but since we are performing this computation in the context of calibration, running times are relatively unimportant. Homotopy methods involve computing the calibration parameters for a specialized case (i.e., no lens distortion, only solving for scale, position, and orientation), and then slowly morphing from the old system to the new system while following all of the local minima. Algebraic elimination methods involve characterizing the sum squared error in terms of a rational polynomial expression, and then setting up a multivariate system corresponding to all of the partial derivatives being zero; since the global minima must be a local extrema, the global minimum is guaranteed to be one of the roots of this multivariate system.

Fortunately, there is a way to sidestep these problems of local minima. However, this requires shrinking the algorithmic specification. It turns out that if lens distortion effects are ignored (i.e., let $G(x,y)=x$ and $H(x,y)=y$), this sum squared problem can be efficiently numerically iteratively solved using a combination of gradient descent and linear-least squares techniques. Linear least squares techniques are preferably used because the only unknown nonlinear terms left (after substituting x and y for $G(x,y)$ and $H(x,y)$) are $P_x, P_y$, the positions of the calibration features in motion stage coordinates. $P_x, P_y$ depend upon $x_c, y_c, \Theta_c$ the unknown position and orientation of the calibration frame with respect to the motion stage (since the positions of the targets on the calibration frame are known).

$$\begin{bmatrix} P_{xi} \\ P_{yi} \end{bmatrix} = \begin{bmatrix} \cos\theta_c & -\sin\theta_c \\ \sin\theta_c & \cos\theta_c \end{bmatrix} \begin{bmatrix} w_x \\ w_y \end{bmatrix} + \begin{bmatrix} x_c \\ y_c \end{bmatrix}$$

Substituting the previous equation into the preceding equation produces:

$$E_{i,j} = \left\| \begin{bmatrix} \cos\theta_j & -\sin\theta_j \\ \sin\theta_j & \cos\theta_j \end{bmatrix} \left( \begin{bmatrix} \cos\theta_c & -\sin\theta_c \\ \sin\theta_c & \cos\theta_c \end{bmatrix} \begin{bmatrix} w_x \\ w_y \end{bmatrix} + \begin{bmatrix} x_c \\ y_c \end{bmatrix} \right) \right.$$

$$\left. \begin{bmatrix} m_{x_j} \\ m_{y_j} \end{bmatrix} - \begin{bmatrix} O_{xi} \\ O_{yi} \end{bmatrix} - \begin{bmatrix} \alpha U & \beta V \\ \alpha V & \beta U \end{bmatrix} \begin{bmatrix} i_{xij} \\ i_{yij} \end{bmatrix} \right\|$$

Since the only non-linear terms are the trigonometric functions of $\Theta_c$, the resulting linearized systems can be set up and solved at specific values of $\Theta_c$, and, then, gradient descent techniques can be used to vary $\Theta_c$ to find the actual orientation. Thereby, this methodology involves alternatively iterating between these two steps until a set of parameters are arrive at which have locally minimum error.

A further appreciation of the invention may be attained by reference to the software listings provided in the Appendix hereto.

Described above is a method of determining a calibration relationship between a reference frame of motion of an object and a reference frame of one or more cameras that generates images of the object. The methods achieve the objects set forth herein by providing improved machine methods that permit calibration of single, as well as multiple camera systems. The methods also minimize reliance on precisely machined calibration targets and plates, by instead relying on a virtual calibration plate "constructed" by moving a single target about the field of view of each camera. The methods, moreover, can be implemented on conventional digital data processors or other conventional machine vision analysis equipment to rapidly determine calibration relationships without undue consumption of resources.

It will be appreciated, of course, that the embodiments described above are merely examples of the invention and that other embodiments incorporation modifications thereto fall within the scope of the invention. For example, it will be appreciated that the calibration relationship between a camera and the moveable object (e.g., motion stage) need not encompass all of the parameters discussed above but may be limited, for example, to one or more of them, e.g., a calibration relationship may be limited to scale along each axis and the relative angle of the reference frames. By way of further example, it will be appreciated that, although much of the discussion herein is directed to cameras, the teachings herein apply equally to other image acquisition devices as well. In view of the foregoing, what we claim is:

What is claimed is:

1. A method of determining a calibration relationship between a reference frame of motion of an object and an image coordinate system (hereinafter "image reference frame") of each of plural image acquisition devices that generate images of the object, the method comprising the steps of:

A. coupling plural targets to the object such that (i) the location and orientation of the targets on the object are not necessarily known, and (ii) the locations and orientations of the targets are any of fixed and known relative to one another;

B. placing the object at plural known locations/orientations relative to the motion reference frame of the object such that at least one target is in a field of view of each respective image acquisition device for plural ones of those locations/orientations, where "location/orientation" refers to at least one of location and orientation, and where "locations/orientations" refers to the plural thereof;

C. generating with each image acquisition device an image of the object at each of the plural known locations/orientations relative to the motion reference frame of the object, and determining a location/orientation of the target in each of those images relative to the image reference frame of the image acquisition device;

D. determining a calibration relationship between the reference frame of motion of the object and the image reference frame of each of the image acquisition devices as a function of (i) the known locations/orientations of the object relative to the notion reference frame of the object and (ii) the locations of the targets in the corresponding images of the object relative to the image reference frame of the image acquisition device, and wherein step (D) comprises the step of determining the calibration relationship by minimizing an error between known locations/orientations of the object and estimates of those locations/orientations based on candidate calibration relationships.

2. A method according to claim 1, wherein step (A) comprises the step of coupling the targets to the object such that the targets have at least known locations with respect to one another.

3. A method according to claim 2, comprising the step of determining the calibration relationship between the image reference frames of the image acquisition devices as a function of (i) the known locations/orientations of the object relative to the motion reference frame of the object, (ii) the locations of the targets in the corresponding images of the object relative to the image reference frame of the image acquisition device, and (iii) the known locations of the targets with respect to one another.

4. A method according to any one of claims 1 and 3, wherein step (D) comprises the step of determining the calibration relationship by solution of a linear equation.

5. A method according to claim 4, wherein step (E) comprises the step of determining the calibration relationship by a linearized least squares fit.

6. A method according to claim 5, wherein step (E) comprises the step of determining the calibration relationship by gradient descent.

7. A method according to any one of claims 1 and 3 comprising the step of repositioning the object based on the calibration relationship between the reference frame of motion of the object and the image reference frame of an image acquisition device.

8. A method of determining a calibration relationship between a reference frame of a motion stage and an image coordinate system (hereinafter, "image reference frame") of each of plural image acquisition devices that generate images of that stage, the method comprising the steps of:

A. placing a calibration plate on the motion stage, the calibration plate including plural targets, where each traget (i) has a known location ($w_{xi}$, $w_{yi}$) on the calibration plate, where at least one target in in the field of view of each image acquisition device, and where the motion stage is at a first known location/orientation ($m_x$, $m_y$, $\theta)_j$, where (j)=1, relative to the reference frame of motion of the object and generating with each of the image acquisition devices a first image of the motion stage;

B. determining a location ($i_x$, $i_y)_{i,j}$, where (j)=1, of the target in each of those first images relative to the image reference frame of the respective image acquisition device;

C. moving the motion stage to one or more other known locations/orientations ($m_x$, $m_y$, $\theta)_j$, where (j)>1, relative to the reference frame of motion of the object such that at least one target is in the field of view of each image acquisition device, and generating with each image acquisition device additional images of the motion stage;

D. determining locations ($i_x$, $i_y)_{i,j}$, where (j)>1, of the target in each of those additional images relative to the image reference frame of the respective image acquisition device; and E. determining a calibration relationship between the reference frame of the motion stage and the image reference frames of the image acquisition devices as a function of (i) the known locations/orientations of the motion stage ($m_x$, $m_y$, $\theta)_j$, where (j)$\geq$1, relative to the reference frame of motion of the object, (ii) the locations ($i_x$, $i_y)_{i,j}$, where (j)$\geq$1, of the targets in the corresponding images relative to the image reference frame of the respective image acquisition device, and (iii) the known locations ($w_{xi}$, $w_{yi}$) of the targets on the calibration plate.

9. A method according to claim 8, comprising the step of repositioning the motion stage as a function of the calibration relationship between the reference frame of the motion stage and the he reference frames of the image acquisition devices.

10. A method of determining a calibration relationship between a reference frame of motion of an object and an image coordinate system (hereinafter "image reference frame") of each of plural image acquisition devices that generate images of the object, the method comprising the steps of:

A. coupling plural targets to the object such that (i) the location and orientation of the targets on the object are not necessarily known, and (ii) the locations and orientations of the targets are any of fixed and known relative to one another;

B. placing the object at plural known locations/orientations relative to the motion reference frame of the object such that at least one target is in a field of view of each respective image acquisition device for plural ones of those locations/orientations, where "location/orientation" refers to at least one of location and orientation, and where "locations/orientations" refers to the plural thereof;

C. generating with each image acquisition device an image of the object at each of the plural known locations/orientations relative to the motion reference frame of the object, and determining a location/orientation of the target in each of those images relative to the image reference frame of the image acquisition device;

D. determining a calibration relationship between the reference frame of motion of the object and the image reference frame of each of the image acquisition devices as a function of (i) the known locations/orientations of the object relative to the motion reference frame of the object and (ii) the locations of the targets in the corresponding images of the object relative to the image reference frame of the image acquisition device.

* * * * *